US012739548B2

(12) United States Patent
Chang et al.

(10) Patent No.: US 12,739,548 B2
(45) Date of Patent: Sep. 15, 2026

(54) AUDIO SIGNAL PROCESSING DEVICE AND METHOD FOR PREVENTING SIGNAL DISTORTION

(71) Applicant: PRIMAX ELECTRONICS LTD., Taipei City (TW)

(72) Inventors: Kuei-Yung Chang, Taipei City (TW); Yang-Hsin Fan, Taipei City (TW)

(73) Assignee: PRIMAX ELECTRONICS LTD., Taipei City (TW)

(*) Notice: Subject to any disclaimer, the term of this patent is extended or adjusted under 35 U.S.C. 154(b) by 224 days.

(21) Appl. No.: 18/732,658

(22) Filed: Jun. 4, 2024

(65) Prior Publication Data

US 2025/0310675 A1 Oct. 2, 2025

(30) Foreign Application Priority Data

Apr. 1, 2024 (TW) ................................ 113112374

(51) Int. Cl.
*H04R 1/08* (2006.01)
*H04R 3/02* (2006.01)

(52) U.S. Cl.
CPC ................ *H04R 1/08* (2013.01); *H04R 3/02* (2013.01)

(58) Field of Classification Search
CPC . H04R 1/08; H04R 3/02; H04R 3/007; H04R 2430/01; H03G 3/3005
See application file for complete search history.

(56) References Cited

U.S. PATENT DOCUMENTS 9,071,268 B1 * 6/2015 Schneider ............ H03M 3/466
10,785,568 B2 * 9/2020 Das ......................... H03M 1/70
2013/0259242 A1 * 10/2013 Schuurmans ......... H03M 3/486 381/56

* cited by examiner

*Primary Examiner* — Jason R Kurr
(74) *Attorney, Agent, or Firm* — WPAT. PC

(57) ABSTRACT

An audio signal processing device includes an analog gain amplification circuit, a peak detection circuit, a codec and digital gain amplifier, a time delay module and an audio output processing circuit. The codec and digital gain amplifier provides a digital gain amplification factor. The analog gain amplification circuit provides at least one analog gain magnification factor. The peak detection circuit generates a peak detection signal. The time delay module provides a signal delay time. In the signal delay time, the codec and digital gain amplifier estimates and judges whether a multiplication result of the peak detection signal, the at least one analog gain amplification factor and the digital gain amplification factor exceeds a peak threshold value, thereby determining whether the at least one analog gain amplification factor and/or the digital gain amplification factor is reduced in advance.

20 Claims, 6 Drawing Sheets

AUDIO SIGNAL PROCESSING DEVICE AND METHOD FOR PREVENTING SIGNAL DISTORTION

FIELD OF THE INVENTION

The present invention relates to an audio signal processing device and an audio signal processing method, and more particularly to an audio signal processing device and an audio signal processing method for preventing signal distortion.

BACKGROUND OF THE INVENTION

Generally, after an analog audio input signal (e.g., a microphone signal) is amplified by an audio signal processing device (e.g., an analog/digital gain amplifier), a processed output signal (e.g., a sound level) is generated. If the processed output signal is suffered from overload or distortion, an instant popping sound is usually generated. The instant popping sound is extremely uncomfortable to the hearer's ears.

However, the existing audio signal processing devices on the market do not have the function of preventing sound breakage and sound distortion. Even if a few solutions have been proposed, they are still unable to timely handle the sound breakage and sound distortion problems associated with the first sound data in the microphone signal.

SUMMARY OF THE INVENTION

An object of the present invention provides an audio signal processing device and an audio signal processing method for preventing signal distortion.

In accordance with an aspect of the present invention, an audio signal processing device for preventing signal distortion is provided. The audio signal processing device includes an analog gain amplification circuit, a peak detection circuit, a codec and digital gain amplifier, a time delay module and an audio output processing circuit. The analog gain amplification circuit includes at least one analog gain amplifier and receiving an analog audio input signal. The analog audio input signal is processed into a first amplified analog audio input signal by the at least one analog gain amplifier through an analog gain amplification process. At least one analog gain magnification factor is provided in the analog gain amplification process. The peak detection circuit is electrically connected with the at least one analog gain amplifier. The analog audio input signal is processed into a second amplified analog audio input signal by the at least one analog gain amplifier through the analog gain amplification process. The peak detection circuit generates a peak detection signal according to the second amplified analog audio input signal. The codec and digital gain amplifier is electrically connected with the analog gain amplification circuit and the peak detection circuit to receive the first amplified analog audio input signal and the peak detection signal. The first amplified analog audio input signal is processed into an analog audio output signal by the codec and digital gain amplifier through an analog-to-digital conversion process, a digital gain amplification process and a digital-to-analog conversion process sequentially. A digital gain amplification factor is provided in the digital gain amplification process. The time delay module is included in at least one of the codec and digital gain amplifier and the analog gain amplification circuit to provide a signal delay time. The audio output processing circuit is electrically connected with the codec and digital gain amplifier. The analog audio output signal is processed into a processed output signal by the audio output processing circuit. In the signal delay time, the codec and digital gain amplifier estimates and judges whether a multiplication result of the peak detection signal, the at least one analog gain amplification factor and the digital gain amplification factor exceeds a peak threshold value, thereby determining whether the at least one analog gain amplification factor and/or the digital gain amplification factor is reduced in advance. If the at least one analog gain amplification factor and/or the digital gain amplification factor is reduced in advance, the signal distortion of the analog audio output signal is prevented in advance.

In an embodiment, the at least one analog gain amplifier includes a first-stage analog gain amplifier and a second-stage analog gain amplifier, which are connected with each other in series.

In an embodiment, the first-stage analog gain amplifier provides a fixed analog gain magnification factor, and the second-stage analog gain amplifier provides a variable analog gain magnification factor.

In an embodiment, the peak detection circuit is electrically connected with an output terminal of the first-stage analog gain amplifier and an input terminal of the second-stage analog gain amplifier. The second amplified analog audio input signal is generated by the first-stage analog gain amplifier according to a multiplication of the analog audio input signal and the fixed analog gain magnification factor. The peak detection circuit receives and detects the second amplified analog audio input signal and generates the peak detection circuit according to the second amplified analog audio input signal.

In an embodiment, the codec and digital gain amplifier is electrically connected with the second-stage analog gain amplifier. The codec and digital gain amplifier receives and controls the variable analog gain amplification factor.

In an embodiment, the time delay module at least includes a delay circuit to provide a signal delay time, and the delay circuit is connected between the first-stage analog gain amplifier, the peak detection circuit and the second-stage analog gain amplifier. An input terminal of the delay circuit is electrically connected with an output terminal of the first-stage analog gain amplifier and an input terminal of the peak detection circuit. An output terminal of the delay circuit is electrically connected with the input terminal of the second-stage analog gain amplifier. After the second amplified analog audio input signal has been inputted into the input terminal of the delay circuit for the signal delay time, the second amplified analog audio input signal is outputted from the output terminal of the delay circuit.

Preferably, in the signal delay time, the codec and digital gain amplifier estimates and judges whether a multiplication result of the peak detection signal, the variable analog gain magnification factor and the digital gain amplification factor exceeds the peak threshold value, thereby determining whether the variable analog gain magnification factor is reduced in advance.

In an embodiment, after the signal delay time, the first amplified analog audio input signal is generated according to a multiplication of the analog audio input signal, the fixed analog gain magnification factor and the variable analog gain magnification factor.

In an embodiment, the codec and digital gain amplifier at least includes a microprocessor and a codec. The microprocessor includes a digital gain amplifier. The microprocessor is electrically connected with an output terminal of the peak detection circuit and receives the peak detection signal. The codec is electrically connected between the second-stage analog gain amplifier, the microprocessor and the audio output processing circuit. The codec receives the first amplified analog audio input signal.

In an embodiment, after the first amplified analog audio input signal is processed into a digital audio input signal by the codec through the analog-to-digital conversion process, the digital audio input signal is processed into an amplified digital audio input signal by the digital gain amplifier through the digital gain amplification process, and the amplified digital audio input signal is processed into the analog audio output signal by the codec through the digital-to-analog conversion process.

In an embodiment, the codec and digital gain amplifier at least includes a microprocessor and a codec. The microprocessor includes a digital gain amplifier. The microprocessor is electrically connected with an output terminal of the peak detection circuit and receives the peak detection signal. The codec is electrically connected between the second-stage analog gain amplifier, the microprocessor and the audio output processing circuit. The codec receives the first amplified analog audio input signal.

In an embodiment, the time delay module of the audio signal processing device at least includes a buffer, and the buffer is included in the microprocessor to provide the signal delay time. After the first amplified analog audio input signal is processed into a digital audio input signal by the codec through the analog-to-digital conversion process, the digital audio input signal is temporarily stored in the buffer. In the signal delay time, the processor estimates and judges whether a multiplication result of the peak detection signal, the variable analog gain magnification factor and the digital gain amplification factor exceeds the peak threshold value, thereby determining whether the digital analog gain magnification factor is reduced in advance.

In an embodiment, after the signal delay time, the digital audio input signal temporarily stored in the buffer is processed into an amplified digital audio input signal by the digital gain amplifier through the digital gain amplification process, and the amplified digital audio input signal is processed into the analog audio output signal by the codec through the digital-to-analog conversion process.

In an embodiment, the signal delay time is at least 2 milliseconds (ms).

In an embodiment, after the at least one analog gain amplification factor and/or the digital gain amplification factor has been reduced, the at least one analog gain amplification factor and/or the digital gain amplification factor is maintained in a gain amplification reduction hold state for at least a reduction hold time. For example, the reduction hold time is at least 200 milliseconds (ms).

In an embodiment, after the at least one analog gain amplification factor and/or the digital gain amplification factor has been reduced, the at least one analog gain amplification factor and/or the digital gain amplification factor is gradually restored to an original digital gain amplification factor and in a gain amplification restore state.

In accordance with another aspect of the present invention, an audio signal processing device method for an audio signal processing device is provided. The audio signal processing method including the following steps. In a step (a), an analog audio input signal is inputted, and an analog gain amplification process is performed, so that a first amplified analog audio input signal is generated. The analog gain amplification process at least provides a fixed analog gain magnification factor and a variable analog gain magnification factor. In a step (b), a second amplified analog audio input signal is obtained according to a multiplication of the analog audio input signal and the fixed analog gain magnification factor, and a peak detection signal is detected according to the second amplified analog audio input signal. Then, a step (c) is performed to judge whether a multiplication result of the peak detection signal, the variable analog gain amplification factor and a digital gain amplification factor exceeds a peak threshold value in a signal delay time, thereby determining whether at least one of the variable analog gain amplification factor and the digital gain amplification factor is reduced in advance. If a judging condition of the step (c) is not satisfied, a step (d) is performed. if the judging condition of the step (c) is satisfied, a step (e) is performed. In the step (d), after the signal delay time, the variable analog gain amplification factor and the digital gain amplification factor are maintained, the second amplified analog audio input signal is processed into the first amplified analog audio input signal, the first amplified analog audio input signal is processed into a processed output signal, and the step (a) is performed again. In a step (e), at least one of the variable analog gain amplification factor and the digital gain amplification factor is reduced in advance within the signal delay time. After the signal delay time, the second amplified analog audio input signal is processed into the first amplified analog audio input signal according to at least one of the variable analog gain amplification factor and the digital gain amplification factor that has been reduced, and the first amplified analog audio input signal is processed into the processed output signal.

In an embodiment, after the step (e), the audio signal processing method further includes the following steps. In a step (f), a gain amplification reduction hold process is performed. The at least one of the variable analog gain amplification factor and the digital gain amplification factor having been reduced is maintained within at least a reduction hold time. Then a step (g) is performed to continuously monitor the peak detection signal in the gain amplification reduction hold process and judge whether the multiplication result of the peak detection signal, the variable analog gain amplification factor and the digital gain amplification factor exceeds the peak threshold value. If the multiplication result exceeds the peak threshold value, the step (e) is performed again. If the multiplication result does not exceed the peak threshold value, a step (h) is performed. Then, a step (h) is performed to judge whether the at least the reduction hold time has reached. If the at least the reduction hold time has not reached, the step (f) is performed again. If the at least the reduction hold time has reached, the step (a) is performed again.

In an embodiment, after the step (e), the audio signal processing method further includes the following steps. In a step (i), a gain amplification restore process is performed. The at least one of the variable analog gain amplification factor and the digital gain amplification factor having been reduced is gradually restored to an original digital gain amplification factor. Then, a step (j) is performed to continuously monitor the peak detection signal in the gain amplification restore process and judge whether the multiplication result of the peak detection signal, the variable analog gain amplification factor and the digital gain amplification factor exceeds the peak threshold value. If the multiplication result exceeds the peak threshold value, the step (e) is performed again. If the multiplication result does not exceed the peak threshold value, a step (k) is performed. Then, a step (k) is performed to judge whether the at least one of the variable analog gain amplification factor and the digital gain amplification factor having been reduced is restored to the original digital gain amplification factor. If a judging condition of the step (k) is not satisfied, the step (i) is performed again. If the judging condition of the step (k) is satisfied, the step (a) is performed again.

In an embodiment, the signal delay time is at least 2 milliseconds (ms).

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. In the following embodiments and drawings, the elements irrelevant to the concepts of the present invention are omitted and not shown.

Figure 1:
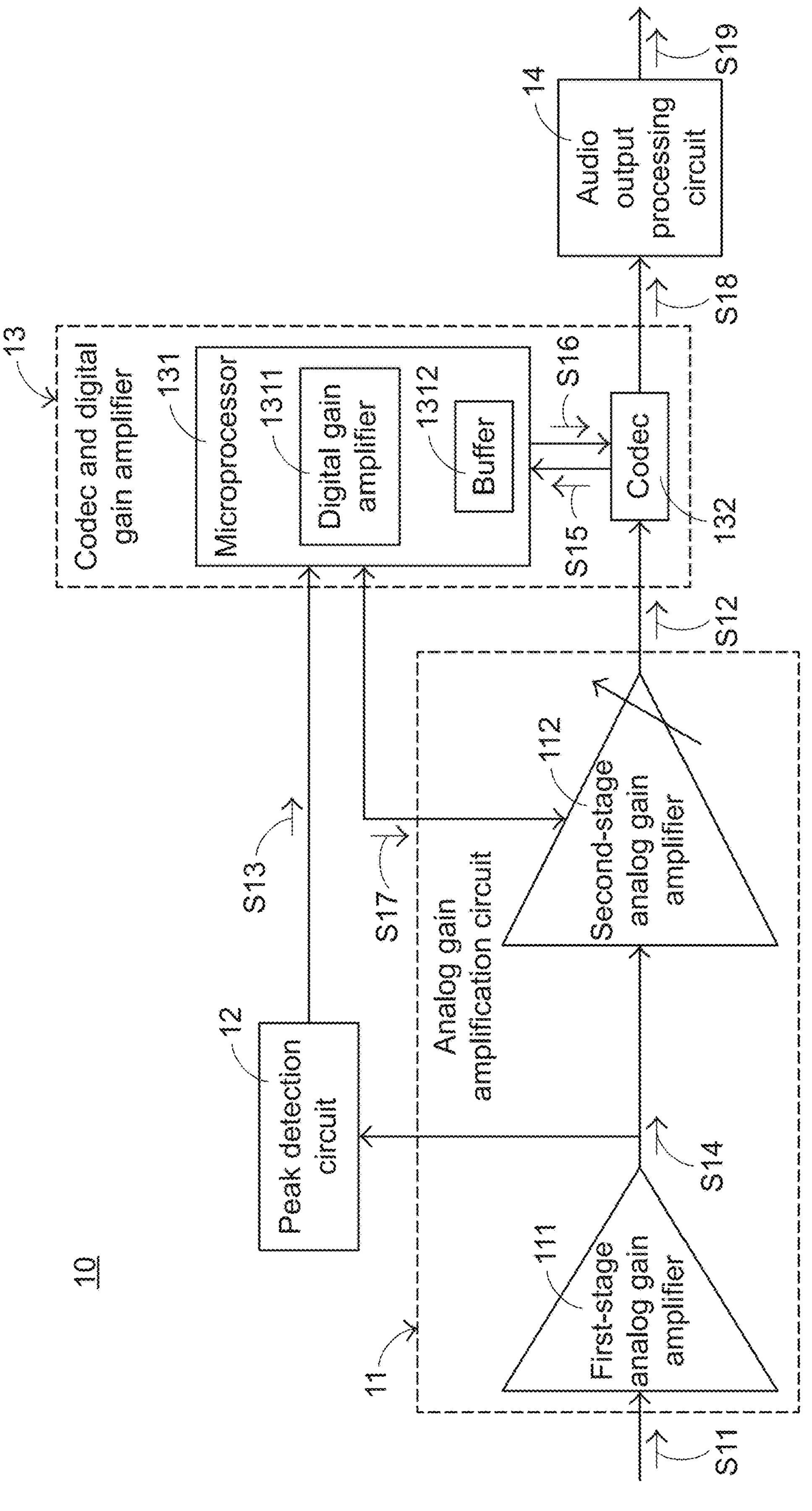
FIG. 1 is a schematic functional block diagram illustrating the architecture of an audio signal processing device according to a first embodiment of the present invention.

FIG. 1 is a schematic functional block diagram illustrating the architecture of an audio signal processing device according to a first embodiment of the present invention. As shown in FIG. 1, the audio signal processing device 10 at least comprises an analog gain amplification circuit 11, a peak detection circuit 12, a codec and digital gain amplifier 13, a time delay module and an audio output processing circuit 14.

The analog gain amplification circuit 11 receives an analog audio input signal S11. The analog gain amplification circuit 11 comprises a first-stage analog gain amplifier 111 and a second-stage analog gain amplifier 112 in series connection. After at least one of the first-stage analog gain amplifier 111 and the second-stage analog gain amplifier 112 performs an analog gain amplification process, a first amplified analog audio input signal S12 is generated. In the analog gain amplification process, at least one analog gain magnification factor is provided. For example, the analog magnification factor corresponding to the first-stage analog gain amplifier 111 is a fixed analog gain magnification factor, and the analog magnification factor corresponding to the second-stage analog gain amplifier 112 is a variable analog gain magnification factor.

It is noted that the stage number or number of the analog gain amplifiers in the analog gain amplification circuit 11 is not restricted. The analog gain magnification factors corresponding to different analog gain amplifiers are not restricted to the fixed analog gain magnification factors or the variable analog gain magnification factors. That is, the operating types of the analog gain magnification factors may be varied according to the practical requirements. In addition, the analog gain magnification factor is determined according to the practical requirements.

After the analog audio input signal S11 is processed by the first-stage analog gain amplifier 111, a second amplified analog audio input signal S14 is generated. That is, the second amplified analog audio input signal S14 is obtained according to the multiplication of the analog audio input signal S11 and the fixed analog gain magnification factor. The peak detection circuit 12 is electrically connected with an output terminal of the first-stage analog gain amplifier 111 and an input terminal of the second-stage analog gain amplifier 112. The peak detection circuit 12 receives and detects the second amplified analog audio input signal S14. According to the detection result, the peak detection circuit 12 acquires the peak value of the second amplified analog audio input signal S14. Consequently, a peak detection signal S13 is generated.

In an embodiment, the codec and digital gain amplifier 13 at least comprises a codec 132 and a microprocessor 131. The microprocessor 131 comprises a digital gain amplifier 1311. The microprocessor 131 is electrically connected with an output terminal of the peak detection circuit 12. In addition, the microprocessor 131 receives the peak detection signal S13. The codec 132 is electrically connected between the second-stage analog gain amplifier 112, the microprocessor 131 and the audio output processing circuit 14. In addition, the codec 132 receives the first amplified analog audio input signal S12. The microprocessor 131 is electrically connected with the second-stage analog gain amplifier 112 to receive the variable analog gain amplification factor or output an analog gain adjustment signal S17. The variable analog gain amplification factor can be controlled according to the analog gain adjustment signal S17.

After the first amplified analog audio input signal S12 is processed by the codec and digital gain amplifier 13 through an analog-to-digital conversion (ADC) process, a digital gain amplification process and a digital-to-analog conversion (DAC) process sequentially, an analog audio output signal S18 is generated. In addition, the digital gain amplification process provides a digital gain amplification factor.

In accordance with a technical feature of FIG. 1, the time delay module of the audio signal processing device 10 at least comprises a buffer 1312. The buffer 1312 is included in the microprocessor 131 to provide a signal delay time. For example, the signal delay time is at least 2 milliseconds (ms). After the first amplified analog audio input signal S12 is processed by the codec 132 through the analog-to-digital conversion (ADC) process, a digital audio input signal S15 is generated and temporarily stored in the buffer 1312. Furthermore, in the signal delay time, the microprocessor 131 estimates and judges whether a multiplication result of the peak detection signal S13, the variable analog gain amplification factor and the digital gain amplification factor exceeds a peak threshold value. According to the judging result, the microprocessor 131 determines whether the digital gain amplification factor is reduced in advance.

After the signal delay time, the digital audio input signal S15 temporarily stored in the buffer 1312 is processed by the digital gain amplifier 1311 through the digital gain amplification process.

Consequently, an amplified digital audio input signal S16 is generated. After the amplified digital audio input signal S16 is received and processed by the codec 132 through the digital-to-analog conversion (DAC) process, the analog audio output signal S18 is generated.

The audio output processing circuit 14 is electrically connected with the codec and digital gain amplifier 13. The audio output processing circuit 14 receives and processes the analog audio output signal S18. Consequently, a processed output signal S19 is generated and issued to an external device (not shown). For example, the external device is a speaker or a headset.

In accordance with another technical feature of FIG. 1, if the digital gain amplification factor has been reduced, the digital gain amplification factor can be maintained in a gain amplification reduction hold state for at least a reduction hold time. For example, the reduction hold time is at least 200 milliseconds (ms).

In the gain amplification reduction hold state, the microprocessor 131 monitors the peak detection signal S13 at any time. Furthermore, the microprocessor 131 judges whether the multiplication result of the peak detection signal S13, the variable analog gain amplification factor and the digital gain amplification factor exceeds the peak threshold value. If the multiplication result exceeds the peak threshold value, the digital gain amplification factor is continuously reduced, and the reduction hold time is re-counted.

On the other hand, if the multiplication result does not exceed the peak threshold value in the gain amplification reduction hold state, the digital gain amplification factor having been reduced will be gradually restored to the original digital gain amplification factor (i.e., the set digital gain amplification factor) after the reduction hold time is ended. For example, the digital gain amplification factor is gradually increased by one level by one level (or the first-level gain amplification factor) every 1 ms (or the first-level gain amplification factor) every 1 ms. Consequently, the digital gain amplification factor is in a gain amplification restore state.

Figure 2:
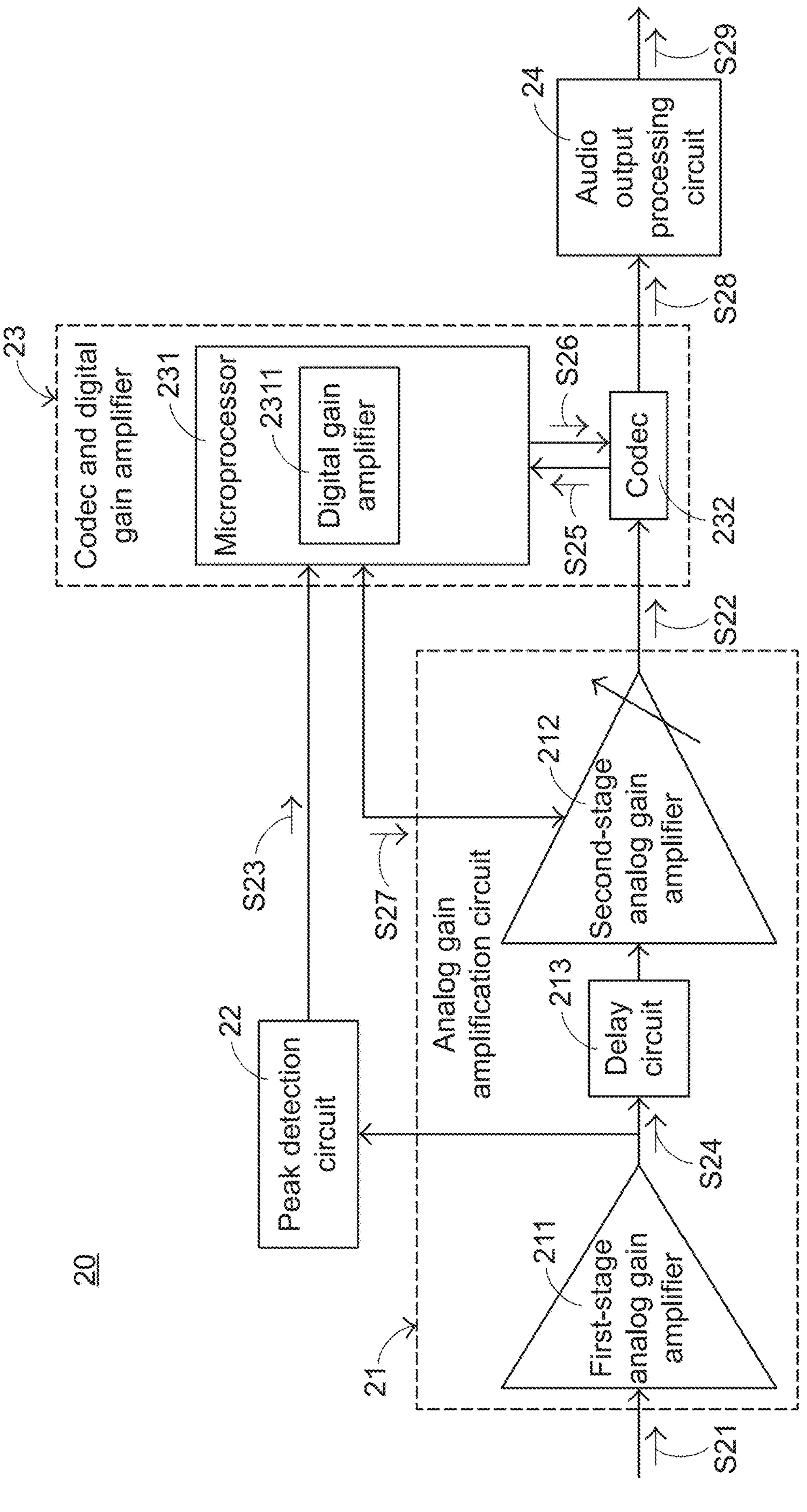
FIG. 2 is a schematic functional block diagram illustrating the architecture of an audio signal processing device according to a second embodiment of the present invention.

FIG. 2 is a schematic functional block diagram illustrating the architecture of an audio signal processing device according to a second embodiment of the present invention. As shown in FIG. 2, the audio signal processing device 20 at least comprises an analog gain amplification circuit 21, a peak detection circuit 22, a codec and digital gain amplifier 23, a time delay module and an audio output processing circuit 24. The operating principles and the electric connection relationship between associated components of the audio signal processing device 20 shown in FIG. 2 are similar to those of the audio signal processing device 10 shown in FIG. 1, and not redundantly described herein. For example, the peak detection circuit 22 and the audio output processing circuit 24 of the audio signal processing device 20 are respectively similar to the peak detection circuit 12 and the audio output processing circuit 14 of the audio signal processing device 10.

In comparison with the audio signal processing device 10 of FIG. 1, the time delay module in the audio signal processing device 20 of this embodiment at least comprises a delay circuit 213 to provide a signal delay time. For example, the signal delay time is at least 2 milliseconds (ms). Similarly, the analog gain amplification circuit 21 comprises a first-stage analog gain amplifier 211 and a second-stage analog gain amplifier 212. The analog magnification factor corresponding to the first-stage analog gain amplifier 211 is a fixed analog gain magnification factor. The analog magnification factor corresponding to the second-stage analog gain amplifier 212 is a variable analog gain magnification factor. In this embodiment, the delay circuit 213 is connected between the first-stage analog gain amplifier 211, the peak detection circuit 22 and the second-stage analog gain amplifier 212.

An input terminal of the delay circuit 213 is electrically connected with an output terminal of the first-stage analog gain amplifier 211 and an input terminal of the peak detection circuit 22. An output terminal of the delay circuit 213 is electrically connected with an input terminal of the second-stage analog gain amplifier 212. After the second amplified analog audio input signal S24 has been inputted into the input terminal of the delay circuit 213 for the signal delay time, the second amplified analog audio input signal S24 is outputted from the output terminal of the delay circuit 213.

Furthermore, in the signal delay time, the microprocessor 231 estimates and judges whether a multiplication result of the peak detection signal S23, the variable analog gain amplification factor and the digital gain amplification factor exceeds a peak threshold value. According to the judging result, the microprocessor 231 determines whether the digital gain amplification factor is reduced in advance according to an analog gain adjustment signal S27.

After the signal delay time, a first amplified analog audio input signal S22 is obtained according to the multiplication of the analog audio input signal S21, the fixed analog gain magnification factor and the variable analog gain magnification factor.

In an embodiment, the codec and digital gain amplifier 23 at least comprises a codec 232 and a microprocessor 231. The microprocessor 231 comprises a digital gain amplifier 2311. The microprocessor 231 is electrically connected with an output terminal of the peak detection circuit 22. In addition, the microprocessor 231 receives the peak detection signal S23. The codec 232 is electrically connected between the second-stage analog gain amplifier 212, the microprocessor 231 and the audio output processing circuit 24. In addition, the codec 232 receives the first amplified analog audio input signal S22. The microprocessor 231 is electrically connected with the second-stage analog gain amplifier 212 to receive the variable analog gain amplification factor or output the analog gain adjustment signal S27. The variable analog gain amplification factor can be controlled according to the analog gain adjustment signal S27.

After the first amplified analog audio input signal S22 is processed by the codec and digital gain amplifier 13 through an analog-to-digital conversion (ADC) process, a digital gain amplification process and a digital-to-analog conversion (DAC) process sequentially, an analog audio output signal S28 is generated. In addition, the digital gain amplification process provides a digital gain amplification factor.

After the first amplified analog audio input signal S22 is processed by the codec 232 through the analog-to-digital conversion (ADC) process, a digital audio input signal S25 is generated. After the digital audio input signal S25 is received processed by the digital gain amplifier 2311 through the digital gain amplification process, an amplified digital audio input signal S26 is generated. After the amplified digital audio input signal S26 is received and processed by the codec 232 through the digital-to-analog conversion (DAC) process, the analog audio output signal S28 is generated.

The audio output processing circuit 24 is electrically connected with the codec and digital gain amplifier 23. After the analog audio output signal S28 is received and processed by the audio output processing circuit 24, a processed output signal S29 is generated.

In accordance with another technical feature of FIG. 2, if the variable analog gain magnification factor has been reduced, the variable analog gain magnification factor can be maintained in a gain amplification reduction hold state for at least a reduction hold time. For example, the reduction hold time is at least 200 milliseconds (ms).

In the gain amplification reduction hold state, the microprocessor 231 monitors the peak detection signal S23 at any time. Furthermore, the microprocessor 231 judges whether the multiplication result of the peak detection signal S23, the variable analog gain amplification factor and the digital gain amplification factor exceeds the peak threshold value. If the multiplication result exceeds the peak threshold value, the variable analog gain magnification factor is continuously reduced, and the reduction hold time is re-counted.

On the other hand, if the multiplication result does not exceed the peak threshold value in the gain amplification reduction hold state, the variable analog gain magnification factor having been reduced will be gradually restored to the original variable analog gain magnification factor (i.e., the set variable analog gain magnification factor) after the reduction hold time is ended. For example, the variable analog gain magnification factor is gradually increased by one level by one level (or the first-level gain amplification factor) every 1 ms (or the first-level gain amplification factor) every 1 ms. Consequently, the variable analog gain magnification factor is in a gain amplification restore state.

Figure 3:
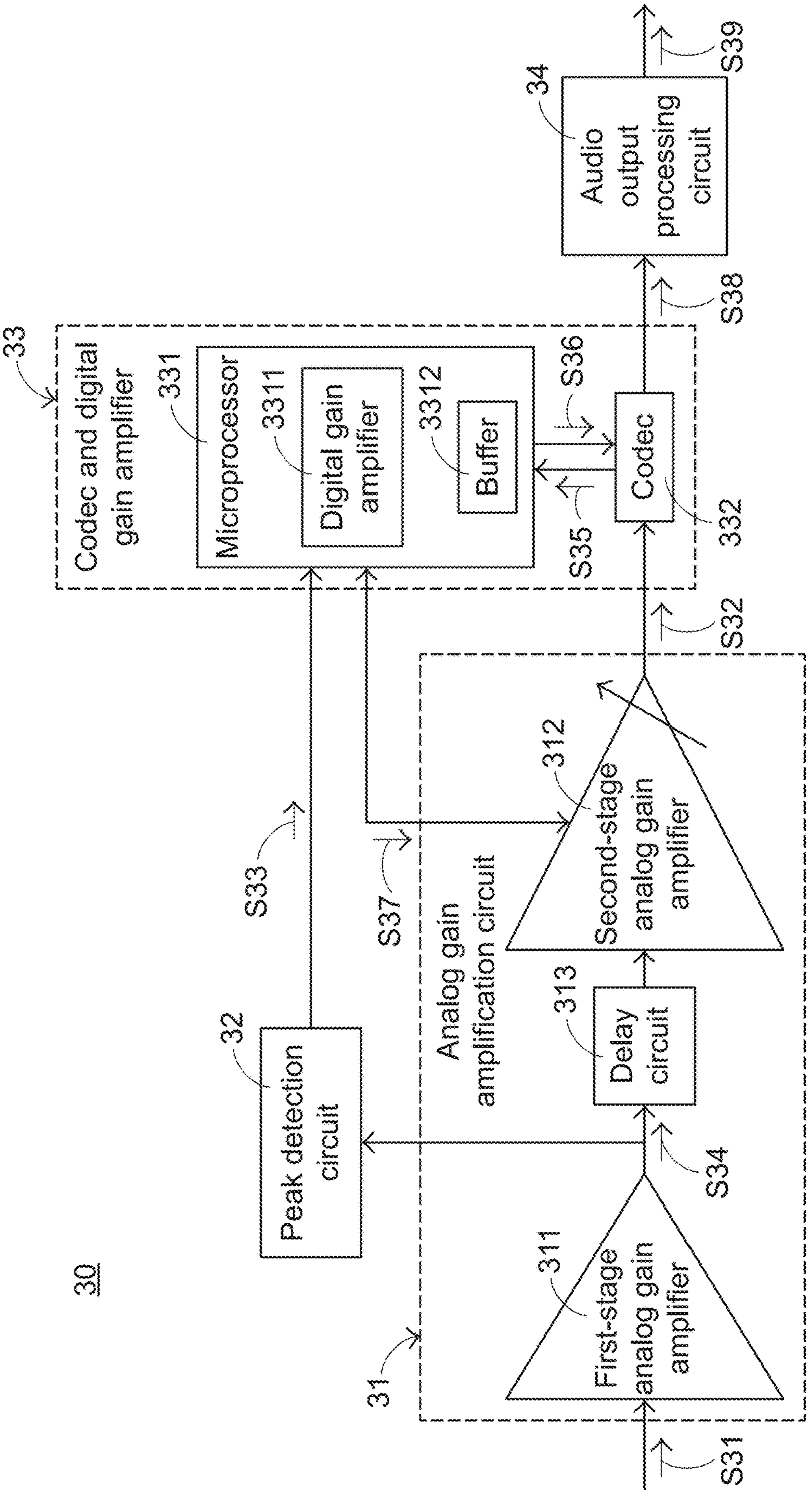
FIG. 3 is a schematic functional block diagram illustrating the architecture of an audio signal processing device according to a third embodiment of the present invention.

FIG. 3 is a schematic functional block diagram illustrating the architecture of an audio signal processing device according to a third embodiment of the present invention. As shown in FIG. 3, the audio signal processing device 30 at least comprises an analog gain amplification circuit 31, a peak detection circuit 32, a codec and digital gain amplifier 33, a time delay module and an audio output processing circuit 34. The operating principles and the electric connection relationship between associated components of the audio signal processing device 30 shown in FIG. 3 are similar to those of the audio signal processing devices shown in FIGS. 1 and 2, and not redundantly described herein. For example, the peak detection circuit 32 and the audio output processing circuit 34 of the audio signal processing device 30 are respectively similar to the peak detection circuit 12 and the audio output processing circuit 14 of the audio signal processing device 10.

The audio signal processing device 30 of FIG. 3 is the combination of the audio signal processing device 10 of FIG. 1 and the audio signal processing device 20 of FIG. 2. In this embodiment, the audio signal processing device 30 of FIG. 3 comprises a buffer 3312 and a delay circuit 313. The buffer 3312 is included in the microprocessor 331 to provide a first signal delay time. For example, the first signal delay time is at least 2 milliseconds (ms). The delay circuit 313 is included in the analog gain amplification circuit 31 to provide a second signal delay time. For example, the second signal delay time is at least 2 milliseconds (ms). Similarly, the analog gain amplification circuit 31 comprises a first-stage analog gain amplifier 311 and a second-stage analog gain amplifier 312. The analog magnification factor corresponding to the first-stage analog gain amplifier 311 is a fixed analog gain magnification factor. The analog magnification factor corresponding to the second-stage analog gain amplifier 312 is a variable analog gain magnification factor. In this embodiment, the delay circuit 313 is connected between the first-stage analog gain amplifier 311, the peak detection circuit 32 and the second-stage analog gain amplifier 312.

An input terminal of the delay circuit 313 is electrically connected with an output terminal of the first-stage analog gain amplifier 311 and an input terminal of the peak detection circuit 32. An output terminal of the delay circuit 313 is electrically connected with an input terminal of the second-stage analog gain amplifier 312. After the second amplified analog audio input signal S34 has been inputted into the input terminal of the delay circuit 313 for the first signal delay time, the second amplified analog audio input signal S34 is outputted from the output terminal of the delay circuit 313.

In the second signal delay time, the codec and digital gain amplifier 33 estimates and judges whether a multiplication result of the peak detection signal S33, the variable analog gain amplification factor and the digital gain amplification factor exceeds a peak threshold value. According to the judging result, the codec and digital gain amplifier 33 determines whether the digital gain amplification factor is reduced through an analog gain adjustment signal S37 in advance.

After the first amplified analog audio input signal S32 is processed by the codec and digital gain amplifier 33 through an analog-to-digital conversion (ADC) process, a digital gain amplification process and a digital-to-analog conversion (DAC) process sequentially, an analog audio output signal S38 is generated. In addition, the digital gain amplification process provides a digital gain amplification factor.

After the first amplified analog audio input signal S32 is processed by the codec 332 through the analog-to-digital conversion (ADC) process, a digital audio input signal S35 is generated and temporarily stored in the buffer 3312. Furthermore, in the second signal delay time, the microprocessor 331 estimates and judges whether a multiplication result of the peak detection signal S33, the variable analog gain amplification factor and the digital gain amplification factor exceeds a peak threshold value. According to the judging result, the microprocessor 331 determines whether the digital gain amplification factor is reduced in advance.

After the second signal delay time, the digital audio input signal S35 temporarily stored in the buffer 3312 is processed by the digital gain amplifier 3311 through the digital gain amplification process.

Consequently, an amplified digital audio input signal S36 is generated. After the amplified digital audio input signal S36 is received and processed by the codec 332 through the digital-to-analog conversion (DAC) process, the analog audio output signal S38 is generated.

The audio output processing circuit 34 is electrically connected with the codec and digital gain amplifier 33. After the analog audio output signal S38 is received and processed by the audio output processing circuit 34, a processed output signal S39 is generated.

In accordance with another technical feature of FIG. 3, if the digital gain amplification factor has been reduced, the digital gain amplification factor can be maintained in a gain amplification reduction hold state for at least a reduction hold time. For example, the reduction hold time is at least 200 milliseconds (ms).

In the gain amplification reduction hold state, the microprocessor 331 monitors the peak detection signal S33 at any time. Furthermore, the microprocessor 331 judges whether the multiplication result of the peak detection signal S33, the variable analog gain amplification factor and the digital gain amplification factor exceeds the peak threshold value. If the multiplication result exceeds the peak threshold value, the digital gain amplification factor is continuously reduced, and the reduction hold time is re-counted.

On the other hand, if the multiplication result does not exceed the peak threshold value in the gain amplification reduction hold state, at least one of the variable analog gain magnification factor and the digital gain amplification factor having been reduced will be gradually restored to the set variable analog gain magnification factor and/or the set digital gain amplification factor) after the reduction hold time is ended. For example, the variable analog gain magnification factor or the digital gain amplification factor is gradually increased by one level by one level (or the first-level gain amplification factor) every 1 ms (or the first-level gain amplification factor) every 1 ms. Consequently, the digital gain amplification factor is in a gain amplification restore state.

In comparison with the embodiment of FIG. 1 or FIG. 2, the audio signal processing device 30 of FIG. 3 will further increase the ability to handle and avoid the signal distortion of the analog audio input signal S31 (e.g., the microphone signal) when the instant popping sound is generated.

Please refer to FIG. 3 again. In an embodiment, the microprocessor 331, the digital gain amplifier 3311 and the codec 332 in the codec and digital gain amplifier 33 are implemented with a hardware component, e.g., a digital signal processor (DSP) or a field programmable gate array (FPGA). In another embodiment, the microprocessor 331 is a general-purpose microprocessor, and the codec 332 is implemented with a firmware that is stored in a memory and has an encoding/decoding function. That is, the implementation of the codec and digital gain amplifier is not restricted.

Figure 4A:
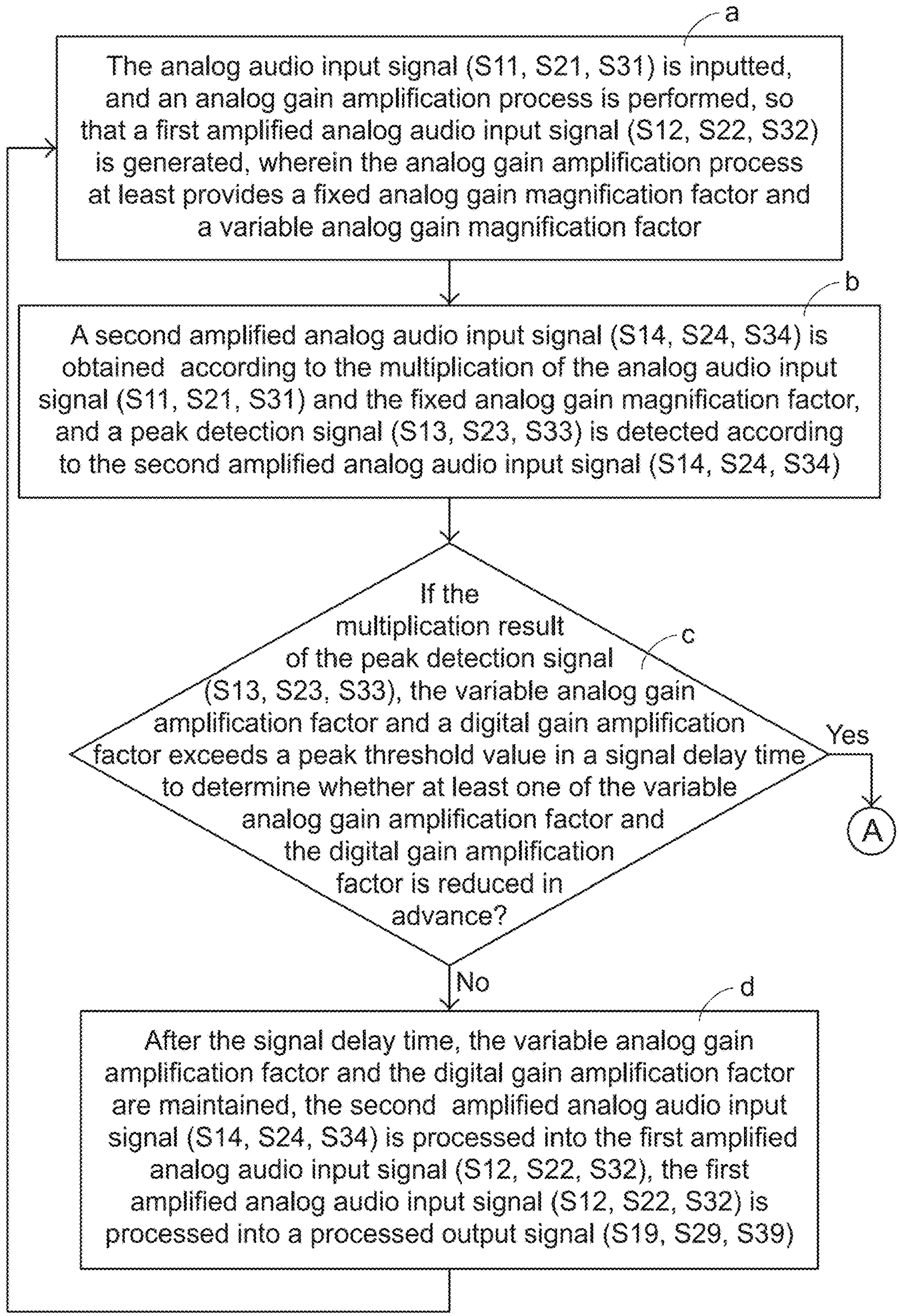
FIGS. 4A, 4B and 4C schematically illustrate the steps of an audio signal processing method according to an embodiment of the present invention.
Figure 4B:
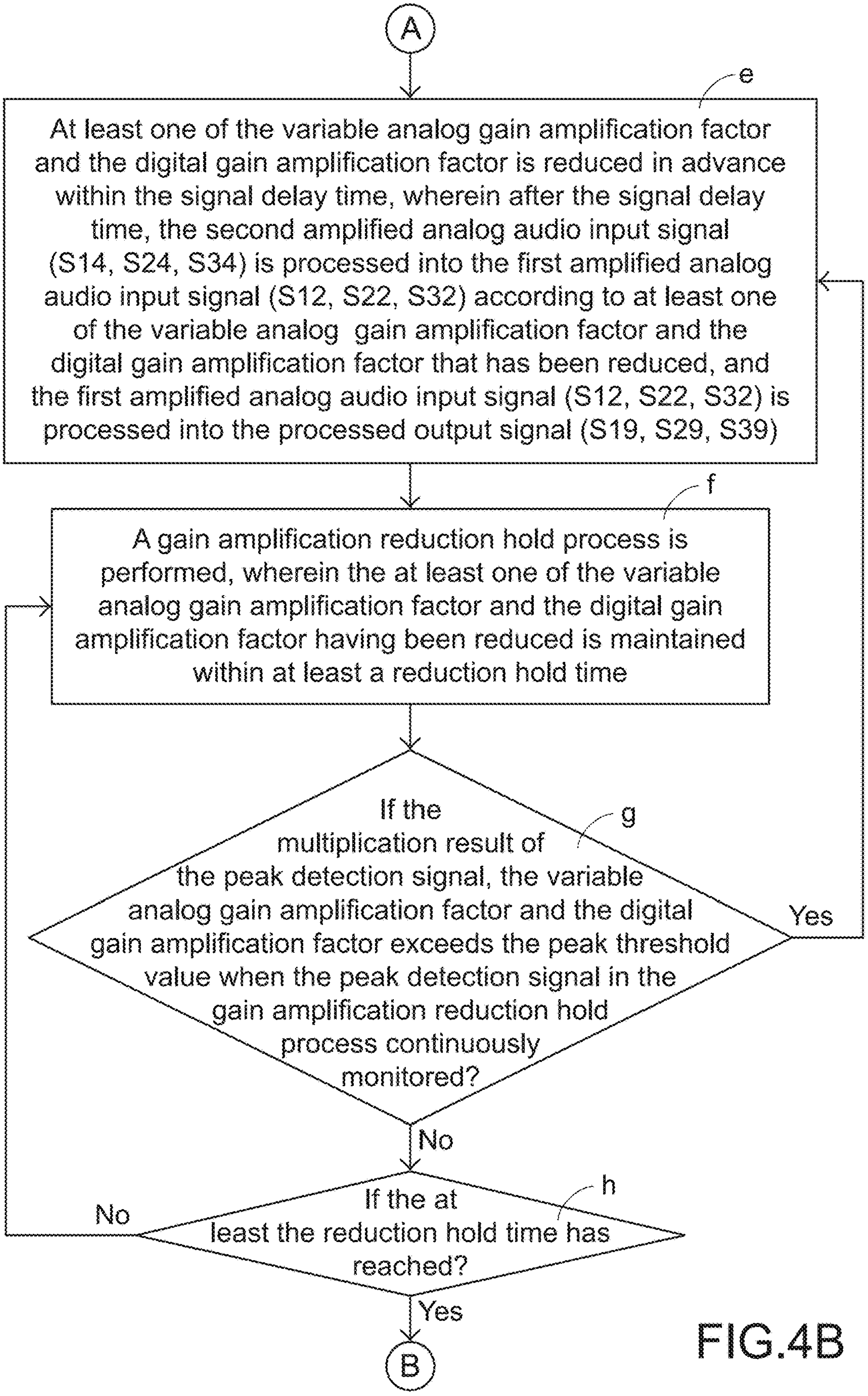
Figure 4C:
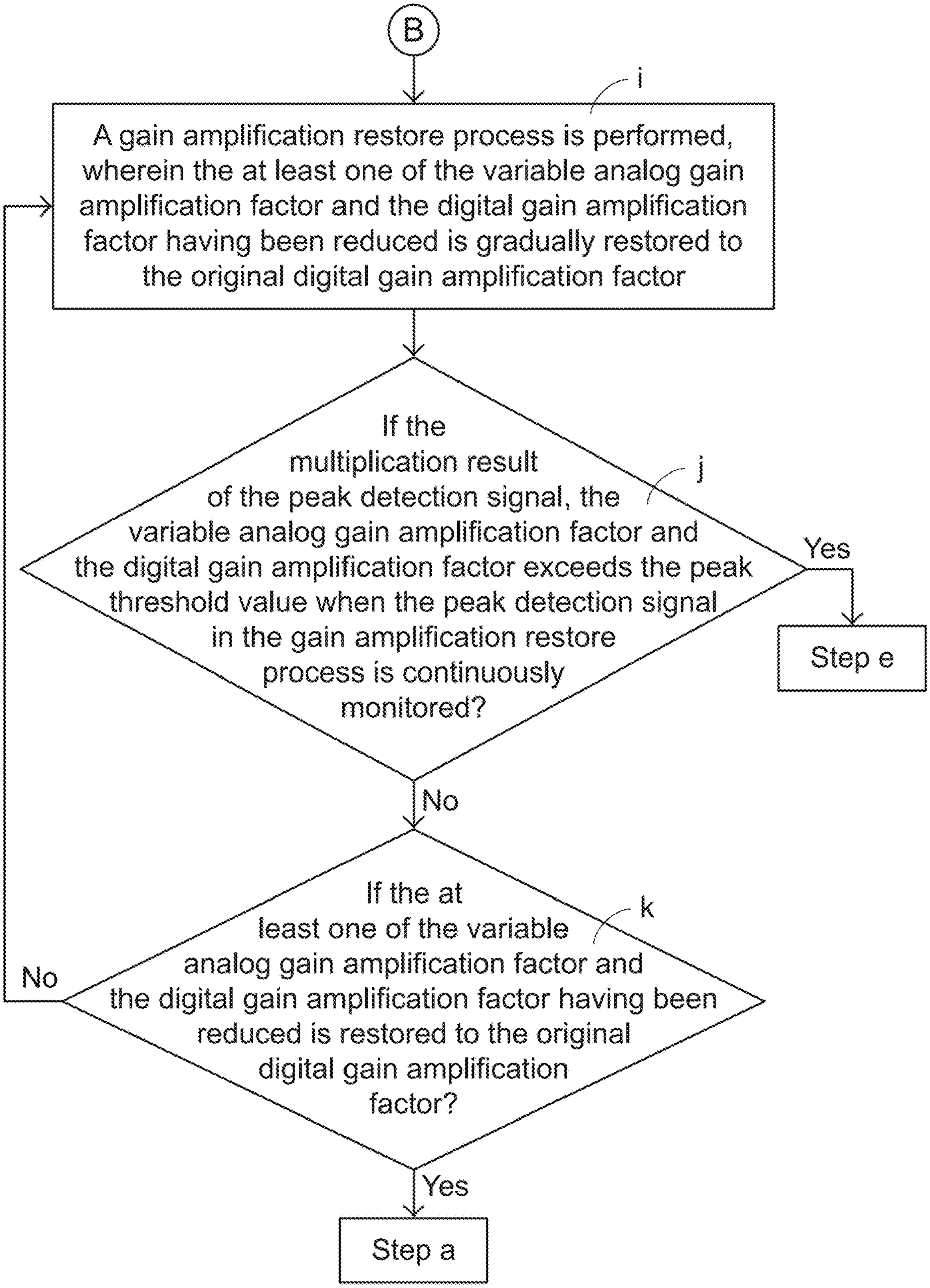

The present invention also provides an audio signal processing method. The audio signal processing method can be applied to the audio signal processing devices 10, 20 and 30 shown in FIGS. 1, 2 and 3. FIGS. 4A, 4B and 4C schematically illustrate the steps of an audio signal processing method according to an embodiment of the present invention. The audio signal processing method at least comprises the following steps.

In a step (a), an analog audio input signal (S11, S21, S31) is inputted, and an analog gain amplification process is performed, so that a first amplified analog audio input signal (S12, S22, S32) is generated, wherein the analog gain amplification process at least provides a fixed analog gain magnification factor and a variable analog gain magnification factor.

In a step (b), a second amplified analog audio input signal (S14, S24, S34) is obtained according to the multiplication of the analog audio input signal (S11, S21, S31) and the fixed analog gain magnification factor, and a peak detection signal (S13, S23, S33) is detected according to the second amplified analog audio input signal (S14, S24, S34).

Then, a step (c) is performed to judge whether a multiplication result of the peak detection signal S13, the variable analog gain amplification factor and a digital gain amplification factor exceeds a peak threshold value in a signal delay time and determine whether at least one of the variable analog gain amplification factor and the digital gain amplification factor is reduced in advance according to the judging result.

In an embodiment, the signal delay time is at least 2 milliseconds (ms). It is noted that the signal delay time is not restricted.

If the judging result of the step (c) indicates that the multiplication result does not exceed the peak threshold value, a step (d) is performed after the signal delay time. In the step (d), the variable analog gain amplification factor and the digital gain amplification factor are maintained, the second amplified analog audio input signal (S14, S24, S34) is processed into the first amplified analog audio input signal (S12, S22, S32), the first amplified analog audio input signal (S12, S22, S32) is processed into a processed output signal (S19, S29, S39), and the step (a) is repeatedly done.

If the judging result of the step (c) indicates that the multiplication result exceeds the peak threshold value, a step (e) is performed. In the step (e), at least one of the variable analog gain amplification factor and the digital gain amplification factor is reduced in advance within the signal delay time, wherein after the signal delay time, the second amplified analog audio input signal (S14, S24, S34) is processed into the first amplified analog audio input signal (S12, S22, S32) according to at least one of the variable analog gain amplification factor and the digital gain amplification factor that has been reduced, and the first amplified analog audio input signal (S12, S22, S32) is processed into the processed output signal (S19, S29, S39).

Furthermore, the at least one of the variable analog gain amplification factor and the digital gain amplification factor having been reduced can be maintained in a gain amplification reduction hold state for at least a reduction hold time. For example, after the step (e), a step (f) is performed.

In the step (f), a gain amplification reduction hold process is performed. Consequently, the at least one of the variable analog gain amplification factor and the digital gain amplification factor having been reduced is maintained within at least a reduction hold time.

For example, the reduction hold time is at least 200 milliseconds (ms). It is noted that the length of the reduction hold time is not restricted.

Then, a step (g) is performed to continuously monitor the peak detection signal in the gain amplification reduction hold process and judge whether the multiplication result of the peak detection signal, the variable analog gain amplification factor and the digital gain amplification factor exceeds the peak threshold value. If the judging result of the step (g) indicates that the multiplication result exceeds the peak threshold value, the step (e) is repeatedly done.

If the judging result of the step (g) indicates that the multiplication result does not exceed the peak threshold value, a step (h) is performed to judge whether the at least the reduction hold time has reached.

If the judging result of the step (h) indicates that the at least the reduction hold time has not reached, the step (f) is repeatedly done. Whereas, if the judging result of the step (h) indicates that the at least the reduction hold time has not reached, a next step (i) is performed.

In the step (i), a gain amplification restore process is performed. Consequently, the at least one of the variable analog gain amplification factor and the digital gain amplification factor having been reduced is gradually restored to the original digital gain amplification factor (i.e., the set digital gain amplification factor). Then, a step (j) is performed to continuously monitor the peak detection signal in the gain amplification restore process and judge whether the multiplication result of the peak detection signal, the variable analog gain amplification factor and the digital gain amplification factor exceeds the peak threshold value. If the judging result of the step (j) indicates that the multiplication result exceeds the peak threshold value, the step (e) is repeatedly done.

If the judging result of the step (j) indicates that the multiplication result does not exceed the peak threshold value, a step (k) is performed to judge whether the at least one of the variable analog gain amplification factor and the digital gain amplification factor having been reduced is restored to the original digital gain amplification factor (i.e., the set digital gain amplification factor). If the at least one of the variable analog gain amplification factor and the digital gain amplification factor having been reduced is not gradually restored to the original digital gain amplification factor, the step (i) is repeatedly done. If the judging condition of the step (k) is not satisfied, the step (a) is repeatedly done.

It is noted that numerous modifications and alterations may be made while retaining the teachings of the invention. In another embodiment of the step (h), if the multiplication result does not exceed the peak threshold value and the at least the reduction hold time has reached, the at least one of the variable analog gain amplification factor and the digital gain amplification factor having been reduced is quickly and directly restored to the original digital gain amplification factor (i.e., the set digital gain amplification factor). That is, the gain amplification factor is not gradually restored by performing the steps (i), (j) and (k).

In a variant example, the steps (f), (g) and (h) related to the gain amplification reduction hold process after the step (e) are omitted. That is, after the step (e), the steps (i), (j) and (k) are performed directly.

From the above descriptions, the present invention provides the audio signal processing device and the audio signal processing method. The peak detection signal (S13, S23, S33) is monitored in advance. According to the result of judging whether the multiplication result of the peak detection signal (S13, S23, S33), the variable analog gain amplification factor and the digital gain amplification factor exceeds a peak threshold value for a time duration, the gain amplification factor is automatically reduced or restored in advance. Due to the technologies of the present invention, the sound volume of the analog audio input signal (S11, S21, S31) such as the microphone signal will not instantaneously increase or decrease in a proportional manner after the analog gain amplification process and/or the digital gain amplification process is started. Consequently, the instant popping sound will be reduced, and the sound distortion will be effectively avoided. As mentioned above, the audio signal processing device and the audio signal processing method of the present invention can effectively handle the sound breakage and sound distortion problems associated with the first sound data in the analog audio input signal (S11, S21, S31). In other words, the audio signal processing device and the audio signal processing method of the present invention are industrially valuable.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. An audio signal processing device for preventing signal distortion, the audio signal processing device comprising:

an analog gain amplification circuit comprising at least one analog gain amplifier and receiving an analog audio input signal, wherein the analog audio input signal is processed into a first amplified analog audio input signal by the at least one analog gain amplifier through an analog gain amplification process, wherein at least one analog gain magnification factor is provided in the analog gain amplification process;

a peak detection circuit electrically connected with the at least one analog gain amplifier, wherein the analog audio input signal is processed into a second amplified analog audio input signal by the at least one analog gain amplifier through the analog gain amplification process, and the peak detection circuit generates a peak detection signal according to the second amplified analog audio input signal;

a codec and digital gain amplifier electrically connected with the analog gain amplification circuit and the peak detection circuit, and receiving the first amplified analog audio input signal and the peak detection signal, wherein the first amplified analog audio input signal is processed into an analog audio output signal by the codec and digital gain amplifier through an analog-to-digital conversion process, a digital gain amplification process and a digital-to-analog conversion process sequentially, and a digital gain amplification factor is provided in the digital gain amplification process;

a time delay circuit included in at least one of the codec and digital gain amplifier and the analog gain amplification circuit to provide a signal delay time; and an audio output processing circuit electrically connected with the codec and digital gain amplifier, wherein the analog audio output signal is processed into a processed output signal by the audio output processing circuit, wherein in the signal delay time, the codec and digital gain amplifier estimates and judges whether a multiplication result of the peak detection signal, the at least one analog gain amplification factor, and the digital gain amplification factor exceeds a peak threshold value, and when the multiplication result exceeds the peak threshold value, the at least one analog gain amplification factor and/or the digital gain amplification factor is reduced for preventing the signal distortion.

2. The audio signal processing device according to claim 1, wherein the at least one analog gain amplifier includes a first-stage analog gain amplifier and a second-stage analog gain amplifier, which are connected with each other in series.

3. The audio signal processing device according to claim 2, wherein the first-stage analog gain amplifier provides a fixed analog gain magnification factor, and the second-stage analog gain amplifier provides a variable analog gain magnification factor.

4. The audio signal processing device according to claim 3, wherein the peak detection circuit is electrically connected with an output terminal of the first-stage analog gain amplifier and an input terminal of the second-stage analog gain amplifier, wherein the second amplified analog audio input signal is generated by the first-stage analog gain amplifier according to a multiplication of the analog audio input signal and the fixed analog gain magnification factor, and the peak detection circuit receives and detects the second amplified analog audio input signal and generates the peak detection circuit according to the second amplified analog audio input signal.

5. The audio signal processing device according to claim 4, wherein the codec and digital gain amplifier is electrically connected with the second-stage analog gain amplifier, wherein the codec and digital gain amplifier receives and controls the variable analog gain amplification factor.

6. The audio signal processing device according to claim 5, wherein the time delay module at least comprises a delay circuit to provide a signal delay time, and the delay circuit is connected between the first-stage analog gain amplifier, the peak detection circuit and the second-stage analog gain amplifier, wherein an input terminal of the delay circuit is electrically connected with an output terminal of the first-stage analog gain amplifier and an input terminal of the peak detection circuit, and an output terminal of the delay circuit is electrically connected with the input terminal of the second-stage analog gain amplifier, wherein after the second amplified analog audio input signal has been inputted into the input terminal of the delay circuit for the signal delay time, the second amplified analog audio input signal is outputted from the output terminal of the delay circuit.

7. The audio signal processing device according to claim 6, wherein in the signal delay time, the codec and digital gain amplifier estimates and judges whether a multiplication result of the peak detection signal, the variable analog gain magnification factor and the digital gain amplification factor exceeds the peak threshold value, thereby determining whether the variable analog gain magnification factor is reduced in advance.

8. The audio signal processing device according to claim 7, wherein after the signal delay time, the first amplified analog audio input signal is generated according to a multiplication of the analog audio input signal, the fixed analog gain magnification factor and the variable analog gain magnification factor.

9. The audio signal processing device according to claim 6, wherein the codec and digital gain amplifier at least comprises:

a microprocessor comprising a digital gain amplifier, wherein the microprocessor is electrically connected with an output terminal of the peak detection circuit and receives the peak detection signal; and a codec electrically connected between the second-stage analog gain amplifier, the microprocessor and the audio output processing circuit, and receiving the first amplified analog audio input signal.

10. The audio signal processing device according to claim 5, wherein the codec and digital gain amplifier at least comprises:

a microprocessor comprising a digital gain amplifier, wherein the microprocessor is electrically connected with an output terminal of the peak detection circuit and receives the peak detection signal; and a codec electrically connected between the second-stage analog gain amplifier, the microprocessor and the audio output processing circuit, and receiving the first amplified analog audio input signal.

11. The audio signal processing device according to claim 10, wherein the time delay module of the audio signal processing device at least comprises a buffer, and the buffer is included in the microprocessor to provide the signal delay time, wherein after the first amplified analog audio input signal is processed into a digital audio input signal by the codec through the analog-to-digital conversion process, the digital audio input signal is temporarily stored in the buffer, wherein in the signal delay time, the processor estimates and judges whether a multiplication result of the peak detection signal, the variable analog gain magnification factor and the digital gain amplification factor exceeds the peak threshold value, thereby determining whether the digital analog gain magnification factor is reduced in advance.

12. The audio signal processing device according to claim 11, wherein after the signal delay time, the digital audio input signal temporarily stored in the buffer is processed into an amplified digital audio input signal by the digital gain amplifier through the digital gain amplification process, and the amplified digital audio input signal is processed into the analog audio output signal by the codec through the digital-to-analog conversion process.

13. The audio signal processing device according to claim 1, wherein after the first amplified analog audio input signal is processed into a digital audio input signal by the codec through the analog-to-digital conversion process, the digital audio input signal is processed into an amplified digital audio input signal by the digital gain amplifier through the digital gain amplification process, and the amplified digital audio input signal is processed into the analog audio output signal by the codec through the digital-to-analog conversion process.

14. The audio signal processing device according to claim 1, wherein the signal delay time is at least 2 milliseconds (ms).

15. The audio signal processing device according to claim 1, wherein if the at least one analog gain amplification factor and/or the digital gain amplification factor has been reduced, the at least one analog gain amplification factor and/or the digital gain amplification factor is maintained in a gain amplification reduction hold state for at least a reduction hold time, wherein the reduction hold time is at least 200 milliseconds (ms).

16. The audio signal processing device according to claim 1, wherein if the at least one analog gain amplification factor and/or the digital gain amplification factor has been reduced, the at least one analog gain amplification factor and/or the digital gain amplification factor is gradually restored to an original digital gain amplification factor and in a gain amplification restore state.

17. An audio signal processing method for an audio signal processing device, the audio signal processing method comprising steps of:

(a) inputting an analog audio input signal, and performing an analog gain amplification process, so that a first amplified analog audio input signal is generated, wherein the analog gain amplification process at least provides a fixed analog gain magnification factor and a variable analog gain magnification factor;

(b) obtaining a second amplified analog audio input signal according to a multiplication of the analog audio input signal and the fixed analog gain magnification factor, and detecting a peak detection signal according to the second amplified analog audio input signal;

(c) judging whether a multiplication result of the peak detection signal, the variable analog gain amplification factor and a digital gain amplification factor exceeds a peak threshold value in a signal delay time, thereby determining whether at least one of the variable analog gain amplification factor and the digital gain amplification factor is reduced in advance, wherein if a judging condition of the step (c) is not satisfied, a step (d) is performed, wherein if the judging condition of the step (c) is satisfied, a step (e) is performed;

(d) after the signal delay time, allowing the variable analog gain amplification factor and the digital gain amplification factor to be maintained, processing the second amplified analog audio input signal into the first amplified analog audio input signal, processing the first amplified analog audio input signal into a processed output signal, and performing the step (a) again;

(e) reducing at least one of the variable analog gain amplification factor and the digital gain amplification factor in advance within the signal delay time, wherein after the signal delay time, the second amplified analog audio input signal is processed into the first amplified analog audio input signal according to at least one of the variable analog gain amplification factor and the digital gain amplification factor that has been reduced, and the first amplified analog audio input signal is processed into the processed output signal.

18. The audio signal processing method according to claim 17, wherein after the step (e), the audio signal processing method further comprises steps of:

(f) performing a gain amplification reduction hold process, wherein the at least one of the variable analog gain amplification factor and the digital gain amplification factor having been reduced is maintained within at least a reduction hold time;

(g) continuously monitoring the peak detection signal in the gain amplification reduction hold process and judging whether the multiplication result of the peak detection signal, the variable analog gain amplification factor and the digital gain amplification factor exceeds the peak threshold value, wherein if the multiplication result exceeds the peak threshold value, the step (e) is performed again, wherein if the multiplication result does not exceed the peak threshold value, a step (h) is performed; and (h) judging whether the at least the reduction hold time has reached, wherein if the at least the reduction hold time has not reached, the step (f) is performed again, wherein if the at least the reduction hold time has reached, the step (a) is performed again.

19. The audio signal processing method according to claim 17, wherein after the step (e), the audio signal processing method further comprises steps of:

(i) performing a gain amplification restore process, wherein the at least one of the variable analog gain amplification factor and the digital gain amplification factor having been reduced is gradually restored to an original digital gain amplification factor;

(j) continuously monitoring the peak detection signal in the gain amplification restore process and judging whether the multiplication result of the peak detection signal, the variable analog gain amplification factor and the digital gain amplification factor exceeds the peak threshold value, wherein if the multiplication result exceeds the peak threshold value, the step (e) is performed again, wherein if the multiplication result does not exceed the peak threshold value, a step (k) is performed;

(k) judging whether the at least one of the variable analog gain amplification factor and the digital gain amplification factor having been reduced is restored to the original digital gain amplification factor, wherein if a judging condition of the step (k) is not satisfied, the step (i) is performed again, wherein if the judging condition of the step (k) is satisfied, the step (a) is performed again.

20. The audio signal processing method according to claim 17, wherein the signal delay time is at least 2 milliseconds (ms).

* * * * *